US008601046B2

(12) United States Patent
Noeldner

(10) Patent No.: US 8,601,046 B2
(45) Date of Patent: Dec. 3, 2013

(54) METHOD AND APPARATUS FOR CALCULATING AN N-POINT DISCRETE FOURIER TRANSFORM

(71) Applicant: LSI Corporation, San Jose, CA (US)

(72) Inventor: David Noeldner, Fort Collins, CO (US)

(73) Assignee: LSI Corporation, Milpitas, CA (US)

( * ) Notice: Subject to any disclaimer, the term of this patent is extended or adjusted under 35 U.S.C. 154(b) by 0 days.

(21) Appl. No.: 13/767,894

(22) Filed: Feb. 15, 2013

(65) Prior Publication Data

US 2013/0159368 A1 Jun. 20, 2013

Related U.S. Application Data

(62) Division of application No. 12/337,925, filed on Dec. 18, 2008, now Pat. No. 8,438,204.

(51) Int. Cl.
*G06F 15/00* (2006.01)

(52) U.S. Cl.
USPC ........... 708/405; 708/403; 708/404; 708/406; 708/407; 708/408; 708/409

(58) Field of Classification Search
None
See application file for complete search history.

(56) References Cited

U.S. PATENT DOCUMENTS

| 4,293,921 | A | * | 10/1981 | Smith, Jr. | 708/405 |
| 4,698,769 | A | * | 10/1987 | McPherson et al. | 708/312 |
| 4,744,042 | A | * | 5/1988 | Hyatt | 708/404 |
| 7,461,114 | B2 | * | 12/2008 | Nakazuru et al. | 708/404 |
| 2005/0256918 | A1 | * | 11/2005 | Pelton | 708/405 |
| 2006/0075010 | A1 | * | 4/2006 | Wadleigh et al. | 708/404 |
| 2006/0184598 | A1 | * | 8/2006 | Buchert et al. | 708/405 |
| 2008/0104158 | A1 | * | 5/2008 | Farhoodfar et al. | 708/405 |
| 2008/0228845 | A1 | * | 9/2008 | Chang | 708/405 |
| 2010/0306298 | A1 | * | 12/2010 | Cenciotti et al. | 708/402 |
| 2012/0320834 | A1 | * | 12/2012 | Branlund et al. | 370/328 |
| 2013/0136071 | A1 | * | 5/2013 | Han et al. | 370/329 |

* cited by examiner

*Primary Examiner* — Neveen Abel Jalil
*Assistant Examiner* — Tyler Torgrimson

(57) ABSTRACT

Described embodiments provide an apparatus for calculating an N-point discrete Fourier transform of an input signal having multiple sample values. The apparatus includes at least one input configured to receive the sample values and a counter to count sample periods. Also included are at least two parallel multipliers to multiply each sample value, with each of the multipliers having a corresponding multiplication factor. There is at least one multiplexer to select one of the at least two parallel multipliers. An adder sums the scaled sample values and an accumulator accumulates the summed sample values. N is an integer and the at least two parallel multipliers are selectable based upon the value of N and the value of the sample period count.

18 Claims, 7 Drawing Sheets

100

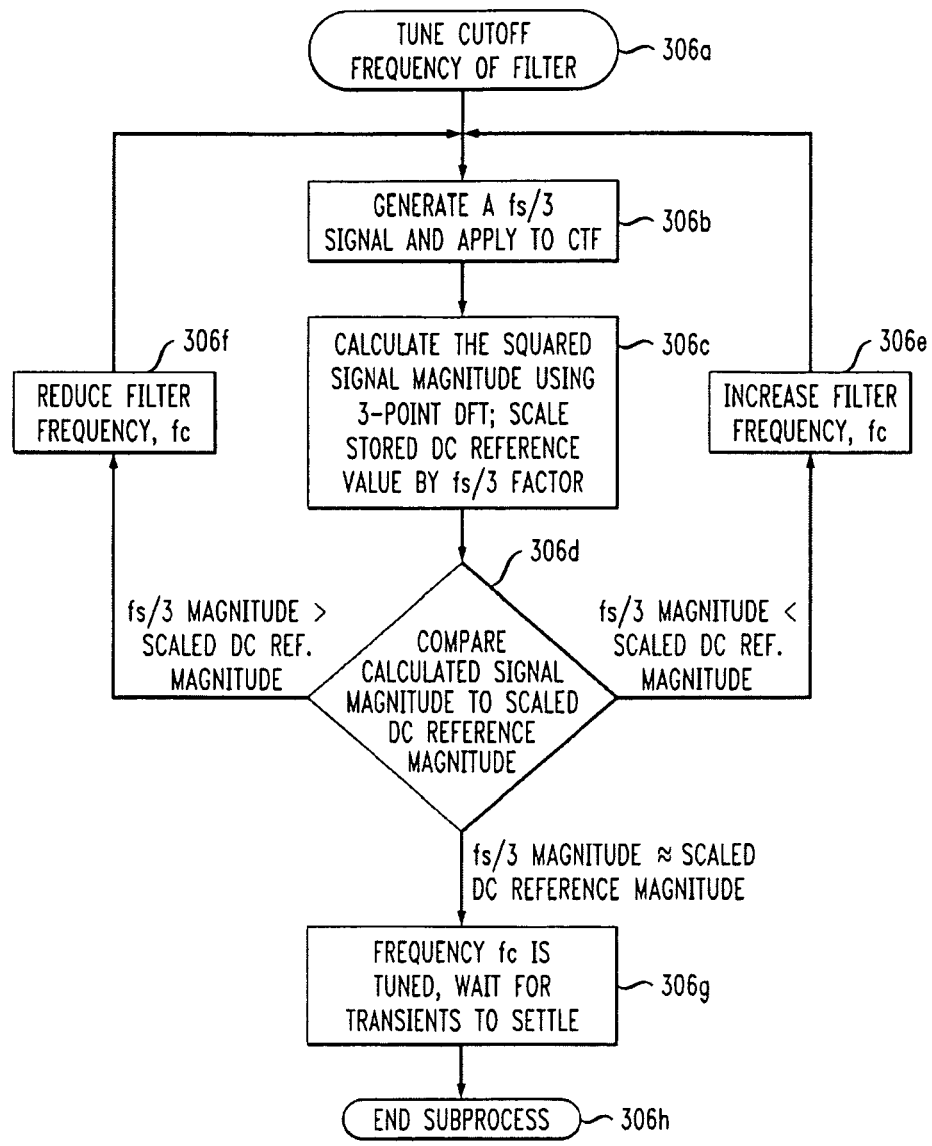

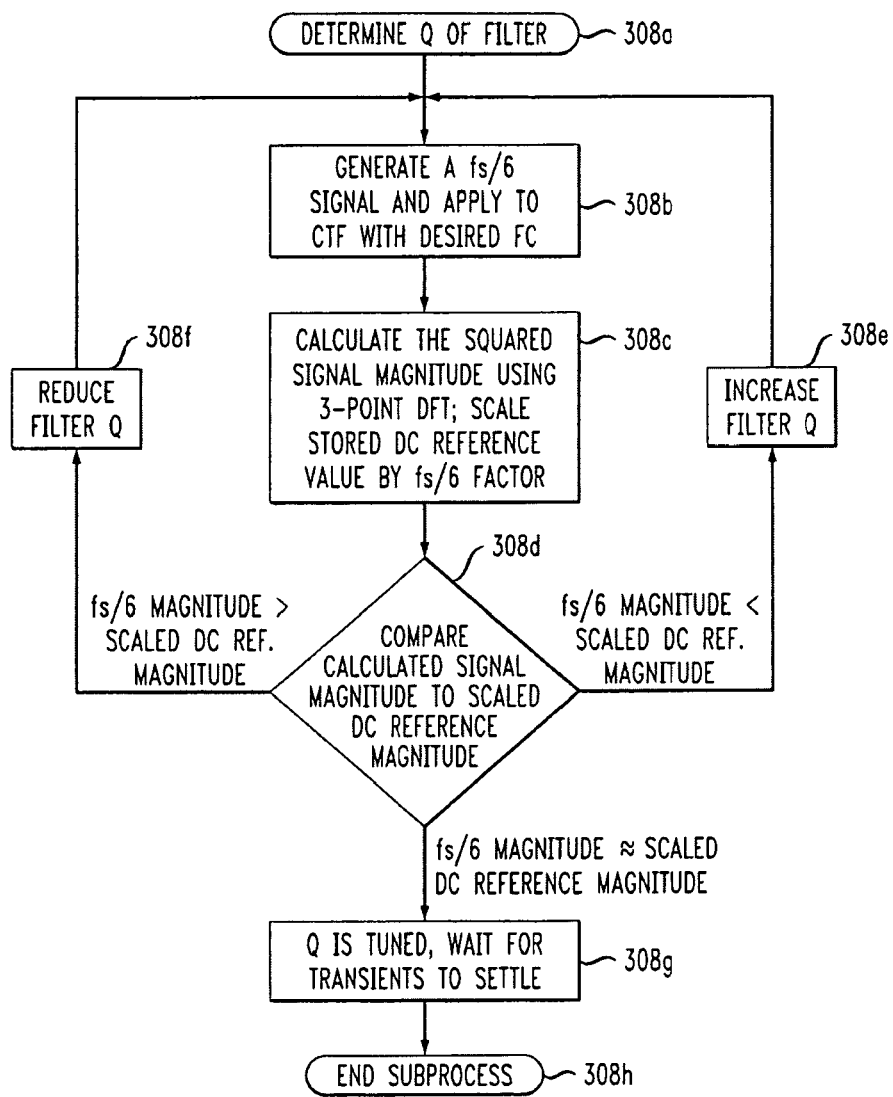

METHOD AND APPARATUS FOR CALCULATING AN N-POINT DISCRETE FOURIER TRANSFORM

CROSS-REFERENCE TO RELATED APPLICATIONS

This application is a continuation of application Ser. No. 12/337,925, filed Dec. 18, 2008, now issued as U.S. Pat. No. 8,438,204, the teachings of which are incorporated herein in their entireties by reference. The subject matter of this application is related to U.S. patent application Ser. No. 12/337,830 filed Dec. 18, 2008 now issued as U.S. Pat. No. 8,046,186, the teachings of which are incorporated herein in their entireties by reference.

BACKGROUND OF THE INVENTION

1. Field of the Invention

The present invention relates to generally to calculating a discrete Fourier transform for signal processing, and, in particular, to an apparatus for calculating an N-point Discrete Fourier Transform.

2. Description of the Related Art

The Fourier transform is a mathematical formula for converting a signal from a time-domain representation to a frequency-domain representation. The discrete Fourier transform ("DFT") may be viewed as a special case of the continuous form of the Fourier transform. The DFT determines a set of spectrum amplitudes from a time-varying signal defined by a periodic sequence of samples taken at discrete time intervals. Techniques developed for more rapid computation of the discrete Fourier transform have become known as the fast Fourier transform ("FFT"), first described in a paper by J. W. Cooley and J. W. Tukey, entitled "An Algorithm for the Machine Calculation of Complex Fourier Series," Mathematics of Computation (1965), Vol. 19, No. 90, pp. 297-301, which is incorporated herein by reference in its entirety.

The FFT is an algorithm that is based on the fact that a discrete Fourier transformation can be generated by combining Fourier transformations of subsets of the input data. In general, the input data is divided into subsets of N data points on which an N-point discrete Fourier transform are performed. Two-point or four-point transforms are popular because the multiplications in two- or four-point Fourier transformations are all operations in which one of the factors is plus or minus unity or plus or minus the square root of minus one, however, other numbers of points may be used.

In a circuit for implementing a fast Fourier transformation, the hardware circuit for performing the N-point Fourier transformation is used repeatedly and is referred to as a butterfly circuit. The choice of what value of N to use depends on a number of factors, including the speed required and the number of sample points in each transformation. However, a four-point circuit can transform only input data whose number of samples is a multiple of 4. Thus, it may be desirable in some applications to use multiple circuits to support transforming data whose number of samples is not a multiple of 4.

An increasingly common technique for computing the fast Fourier transform is to employ a microprocessor programmed to perform the function. However, because of the generalized nature of microprocessor architecture, the relatively slow speed of computation is a significant limiting factor for many applications. Therefore, in view of the foregoing, it will be apparent that there has been a need for a fast Fourier transform circuit having that computes Fourier transform coefficients in parallel to achieve higher speed, allows for N to be selectable in computing an N-point discrete Fourier transform, and utilizes minimal physical space.

SUMMARY OF THE INVENTION

In an exemplary embodiment, the present invention provides an apparatus for calculating an N-point discrete Fourier transform of an input signal having multiple sample values. The apparatus has at least one input configured to receive the sample values and a counter to count sample periods. Also included are at least two parallel multipliers to multiply each sample value, with each of the multipliers having a corresponding multiplication factor. There is at least one multiplexer to select one of the at least two parallel multipliers. An adder sums the scaled sample values and an accumulator accumulates the summed sample values. In this embodiment, N is an integer and the at least two parallel multipliers are selectable based upon the value of N and the value of the sample period count.

In another exemplary embodiment, the present invention provides another apparatus for calculating an N-point discrete Fourier transform. The apparatus has a first input configured to receive an even quadrature sample value and an even phase sample value in a sample period and a second input configured to receive an odd quadrature sample value and an odd phase sample value in a sample period. The apparatus also includes a counter to count the sample periods. An even sample value scaling circuit and an odd sample value scaling circuit scale the respective sample values by a selectable scaling factor, and a first adder sums the scaled even and odd quadrature sample values and a second adder sums the scaled even and odd phase sample values. A first accumulator accumulates the summed even and odd quadrature sample values and a second accumulator accumulates the summed even and odd phase sample values. In this embodiment, N is selectable and is either 3 or 4, and the sample value scaling is selectable based upon the value of N and the value of the sample period count. Further, when N is set to 3, the counter counts 3 sample periods, and wherein when N is set to 4, the counter counts 2 sample periods.

BRIEF DESCRIPTION OF THE DRAWINGS

Other aspects, features, and advantages of the present invention will become more fully apparent from the following detailed description, the appended claims, and the accompanying drawings in which like reference numerals identify similar or identical elements.

FIGS. 4a, 4b and 4c show greater detail of some of the steps of the method shown in FIG. 3.

DETAILED DESCRIPTION

As described herein, embodiments of the present invention provide an apparatus for calculating an N-point Discrete Fourier Transform.

This application describes different embodiments of the present invention. So as not to obscure the invention, some specific details of the various embodiments that are within the knowledge of a person of ordinary skill in the art may not be discussed herein.

Figure 1:
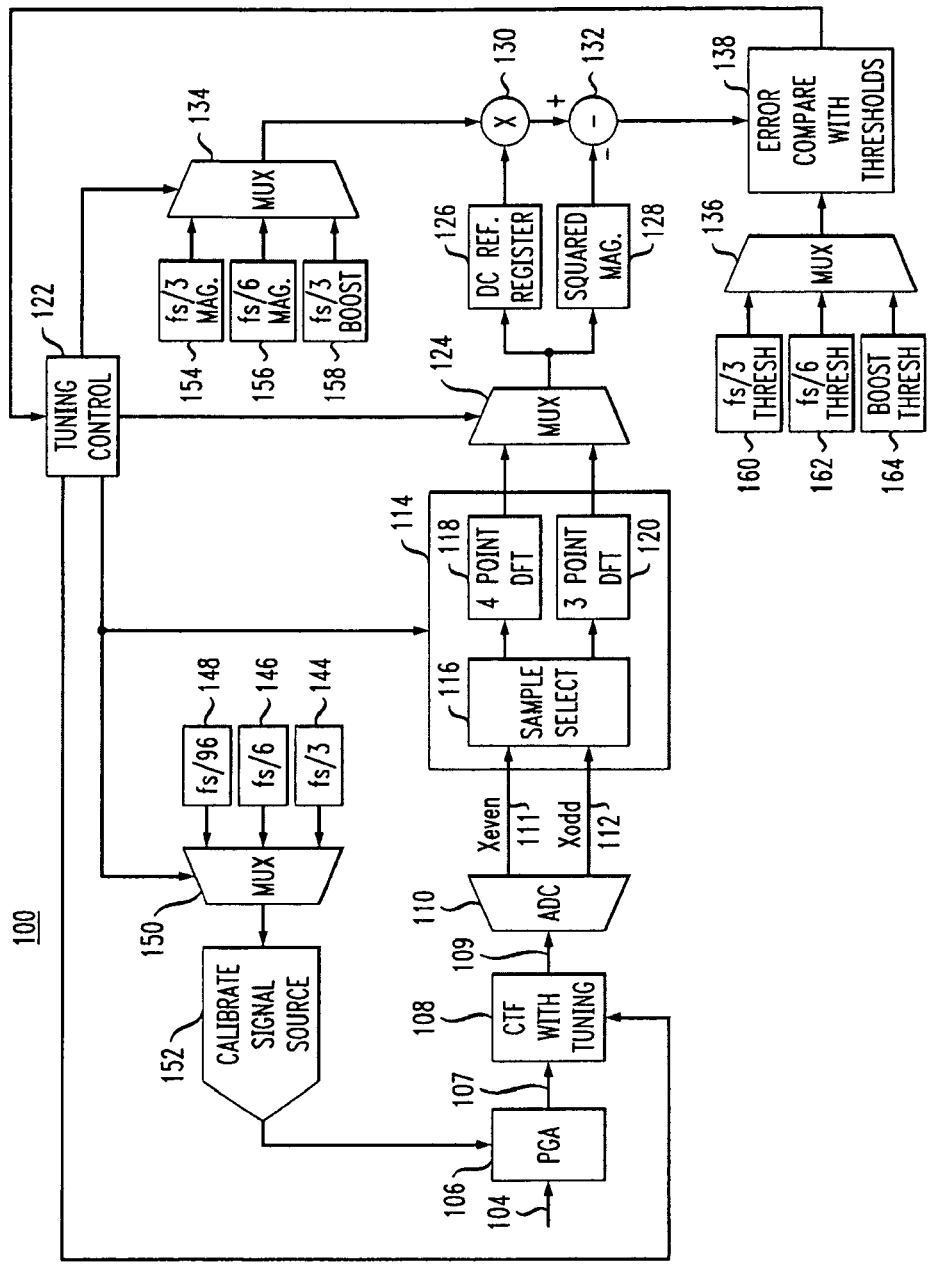
FIG. 1 shows a block diagram of an exemplary tuning circuit for a precision continuous-time filter, in accordance with an embodiment of the present invention.

FIG. 1 shows a block diagram of an exemplary tuning circuit for precision continuous-time filter 100 in accordance with an embodiment of the present invention. While a plurality of multiplexers, registers, multipliers and subtractors are shown as separate blocks in FIG. 1 for ease of description, it will be apparent to one of ordinary skill in the art that such blocks, as described in greater detail below, could be implemented as software and a microprocessor.

In normal operation when a filter calibration is not being performed, an analog input signal on input 104 is provided to programmable gain amplifier ("PGA") 106 and calibration signal source 152 is idle. The output 107 of PGA 106 is provided to a continuous-time filter ("CTF") 108, which will be described in greater detail with respect to FIG. 2. A filtered signal 109 is output from CTF 108 and is provided to quantizer 110. Quantizer 110 samples the output of the CTF at a sample rate fs. In an exemplary embodiment of the present invention, quantizer 110 takes two samples per clock cycle (Xeven and Xodd). In normal operation, magnitude calculation block 114 is idle and the outputs 111 and 112 of quantizer 110 are provided to external circuitry (not shown).

As will be described in more detail below, in the calibration mode, the calibration signal source 152 is active. In one exemplary embodiment, the calibration signal source 152 (for example, a conventional programmable frequency synthesizer) provides a square-wave calibration signal of varying frequencies, shown as calibration signals 144, 146 and 148. One of the calibration signals 144, 146 or 148 is selected by multiplexer 150, under the control of tuning controller 122. In one exemplary embodiment of the invention, tuning controller 122 is a microprocessor, and calibration signals 144, 146 and 148 may be values stored in memory registers in controller 122 and are used to control the frequency of calibration signal source 152.

The calibration signal is provided to programmable gain amplifier 106, which is in electrical communication with CTF 108. An amplifier and filtered calibration signal is output from CTF 108 and is provided to quantizer 110. Quantizer 110 samples the output of the CTF 108, as described above.

The outputs of quantizer 110 are provided to magnitude calculation block 114 and the connection to external circuitry is idle. Magnitude calculation block 114 comprises sample selection block 116, a 4-point discrete Fourier transform ("DFT") 118 and a 3-point DFT 120. An alternative embodiment of the present invention can be implemented using only 3-point DFT 120. The operation of sample selection block 116, DFT 118 and DFT 120 will be described in greater detail in relation to FIG. 5.

The outputs of DFT 118 and DFT 120 are provided to multiplexer 124. Tuning controller 122 sets multiplexer 124 to select which one of DFT 118 or DFT 120 is in operation during calibration. The selected DFT output is provided to DC reference register 126. The selected DFT output is also squared and provided to squared magnitude register 128. As will be described in greater detail with reference to FIGS. 3, 4a, 4b and 4c, the value stored in DC reference register 126 is scaled by a calibration frequency factor at multiplication block 130. The calibration frequency factor is selected by multiplexer 134, controlled by tuning controller 122. The calibration frequency factors 154, 156 and 158 are values that may be stored in memory registers in controller 122. At subtraction block 132, the value stored in squared magnitude register 128 is then subtracted from the scaled DC reference value. The difference between these values is then compared to a calibration frequency threshold value at threshold comparison block 138. The calibration frequency threshold value is selected by multiplexer 136, controlled by tuning controller 122 (connection not shown). The calibration frequency threshold values 160, 162 and 164 are values that may be stored in memory registers in controller 122. Based upon the result of the threshold comparison at block 138, the cutoff frequency, fc, and the quality factor, Q, of CTF 108 may be adjusted by changing the values that may be stored in memory or registers within controller 122, as discussed in greater detail below. As would be apparent to one skilled in the art, in exemplary embodiments, subtraction block 132 and threshold comparison block 138 may be implemented as software on a microprocessor, which may be the same microprocessor used to implement tuning controller 122.

Figure 2:
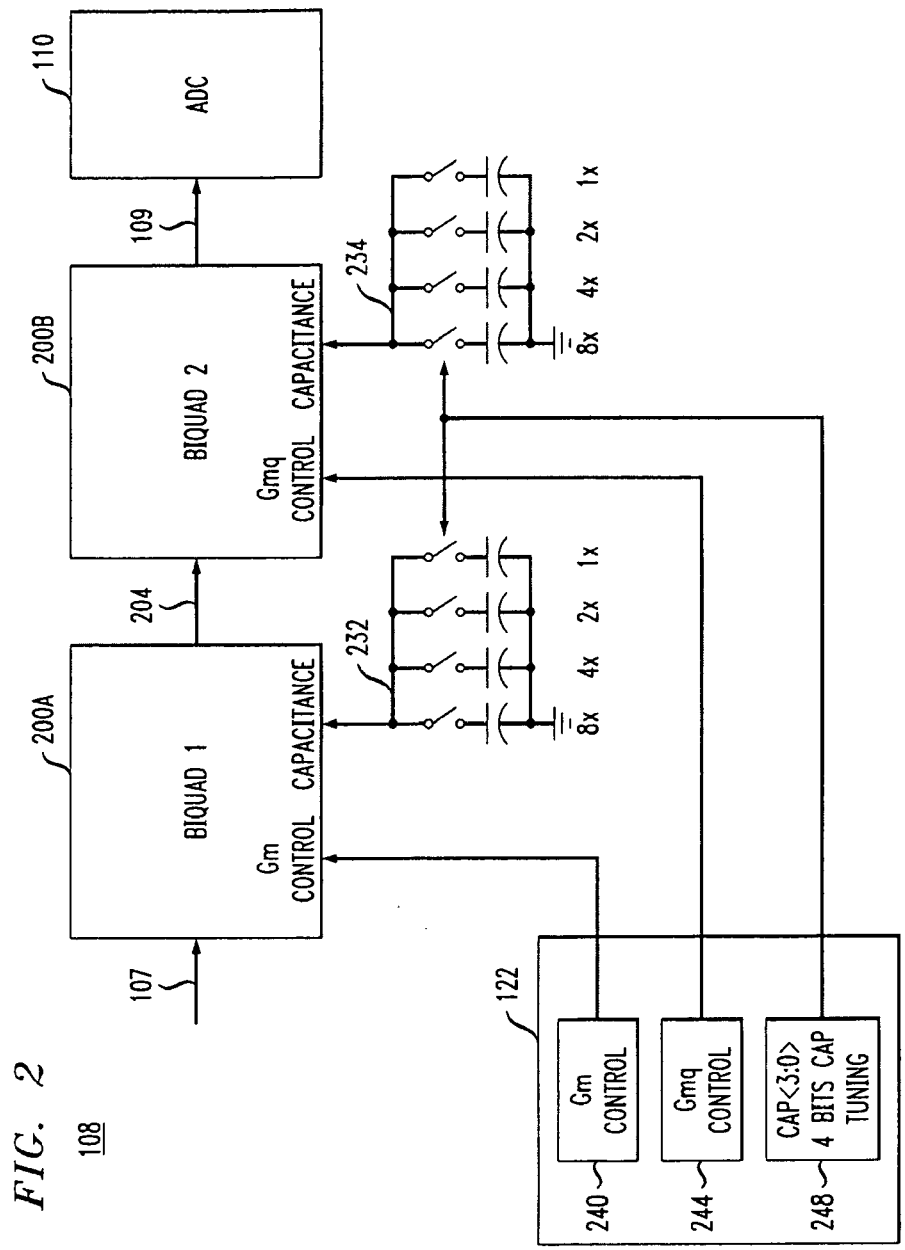
FIG. 2 shows a schematic of an exemplary precision continuous-time filter with tuning control with digital control and controller, in accordance with an embodiment of the present invention.

Now referring to FIG. 2, it is shown a simplified schematic of CTF filter 108, in accordance with an exemplary embodiment of the present invention. As shown, CTF 108 is a conventional low-pass dual Gm-C biquad filter with adjustable tuning parameters. A first biquad filter of CTF 108, a conventional low-pass biquad filter and denoted as biquad 200A, is adapted to primarily determine the cutoff frequency, fc, of CTF 108. A second biquad filter of CTF 108 in tandem with biquad 200A, also a conventional low-pass biquad filter and denoted as biquad 200B, is adapted to primarily determine the Q of CTF 108. As will be described in greater detail below, to tune the cutoff frequency, fc, of CTF 108, the gain, Gm, of biquad 200A and the capacitance of capacitor arrays 232 and 234 are adjusted, and the ratio of Gm and Gmq is held constant so only fc is changed. To tune the Q of CTF 108 to provide peak gain at the desired frequency, the gain of biquad 200B, Gmq, is adjusted, and the ratio of Gm and Gmq is no longer fixed. It is understood that other types of filters may be used for CTF 108, such as high-pass filters, and may be implemented using, for example, Chebyshev or Butterworth configurations.

As shown in FIG. 2, biquad 200A is in electrical communication with tuning controller 122 (FIG. 1) and binary-weighted capacitor array 232. Tuning controller 122 includes the Gm control register 240 which controls the value of the gain, Gm, of biquad 200A. Tuning controller 122 also includes CAP register 248, which controls the value of the capacitor arrays 232 and 234. As shown in FIG. 2, capacitor arrays 232 and 234 share a common control line but, as would be apparent to one skilled in the art, capacitor arrays 232 and 234 may be independently controlled. Capacitor arrays 232 and 234 each comprise four capacitance values that can be switched into the circuit, based upon the value of the CAP register 248. In an exemplary embodiment the values of capacitor arrays 232 and 234 are held in a substantially fixed ratio to each other. In one embodiment, the values of capacitor arrays 232 and 234 are substantially equal. Biquad 200B is in electrical communication with tuning controller 122 and binary-weighted capacitor array 234. Tuning controller 122 includes the Gmq control register 244, which controls the value of the gain, Gmq, of biquad 200B.

As would be apparent to one of skill in the art, the gain of a conventional Gm-C biquad filter may be adjusted by several means, including by changing the transconductor current in the filter, changing the reference voltage to the transconductors, or by adding additional gain stages. In an exemplary embodiment of the present invention, the gain, Gm, of biquad 200A, is determined by a variable current source Idac (not shown), where Gm=Idac/Vref, and Vref is the reference voltage of the transconductors of biquad 200A and is approximately equal to 80 mV in one embodiment. The output of the variable current source Idac is controlled by the setting of the Gm control register 240. During the step of tuning the cutoff frequency of CTF 108, described in more detail with regard to FIGS. 3 and 4, the gain, Gmq, of biquad 200B is held in an approximately fixed ratio with the gain, Gm, of biquad 200A. This ratio is determined by the equation Gmq=(Gm*Vref) Vrefq, where Vrefq is the reference voltage of the transconductors in biquad 200B, and in this embodiment, Vref is a substantially fixed voltage.

To set the highest frequency, fc, of CTF 108, variable current source Idac is set to output the maximum current by changing the value stored in the Gm control register 240. When Idac is at its maximum, both biquads are at their maximum gain due to Gm and Gmq being held in a fixed ratio. The 4-bit CAP register 248 will be set so that none of the capacitors in arrays 232 and 234 are switched into the circuit, leaving only parasitic capacitance and any associated fixed capacitance in the circuit and, thus, the capacitance in the circuit is at its minimum value. Therefore, with maximum Idac and minimum capacitance, fc is at its maximum value.

To lower fc, Idac is lowered by changing the setting of Gm control register 240, and additional capacitors are switched in to increase the capacitance of arrays 232 and 234 by changing the setting of the 4-bit CAP register 248. By lowering Idac, the gain of the transconductors of biquad 200A is reduced. During frequency tuning, the ratio of Gm to Gmq is held approximately constant to avoid changing the Q of CTF 108 when changing fc. Thus, the value of Gmq will track the value of Gm during frequency tuning of CTF 108. As would be apparent to one of skill in the art, a table showing the filter frequency and the corresponding settings for the Gm control and CAP registers could be constructed. In an exemplary embodiment of the filter, fc can be tuned from 270 MHz to 1.28 GHz.

To set the filter Q value, the value of the Gmq control register 244 is changed while leaving Gm and the capacitance of arrays 232 and 234 unchanged. During Q tuning of CTF 108, the ratio of Gm to Gmq is not held constant. The value of Gmq control register 244 changes the reference voltage, Vrefq, of the transconductors in biquad 200B. An increase in Vrefq corresponds to a decrease in Gmq, which in turn corresponds to an decrease in the Q of the filter. In an exemplary embodiment of the filter, Q can be tuned from 0.9 to 2.8.

Figure 3:
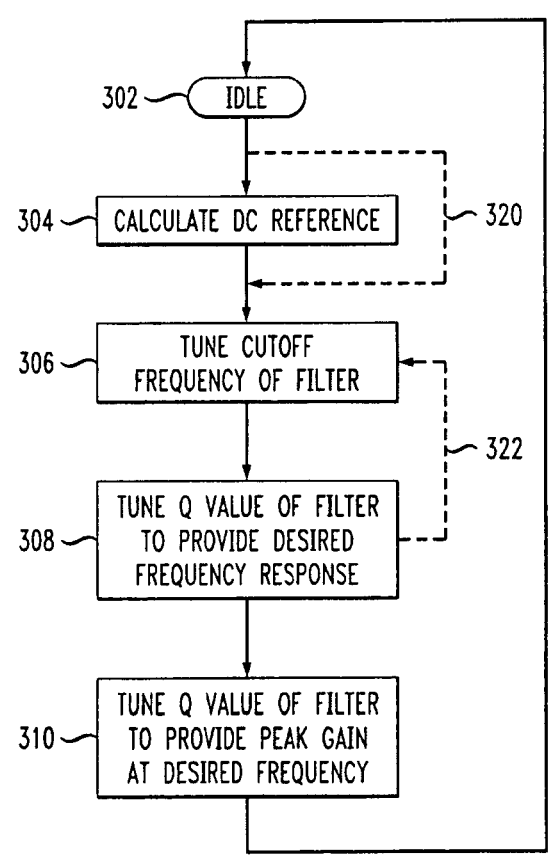
FIG. 3 shows a block diagram of an exemplary method for tuning a precision continuous-time filter, in accordance with an embodiment of the present invention.
Figure 4A:
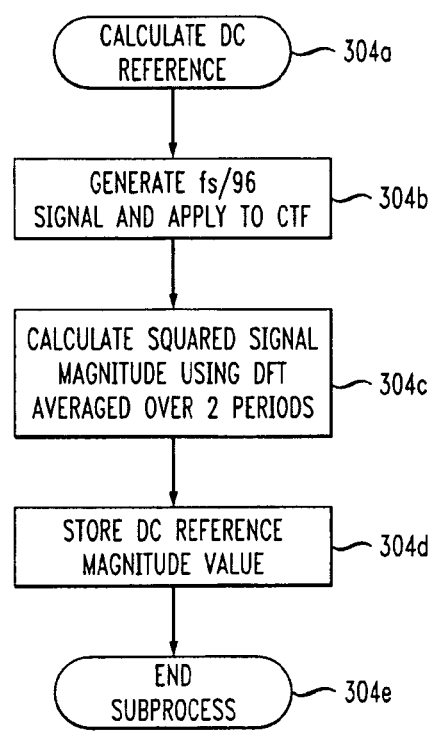

FIG. 3 shows an exemplary block diagram of calibration sequence 300, a method for tuning a precision continuous-time filter in accordance with an exemplary embodiment of the present invention. Step 302 shows that the calibration sequence 300 operates in idle mode until a calibration is needed. For example, calibration could be run on power-up of the system, or at intervals during system operation to calibrate for PVT (Process, Voltage, Temperature) variations over time. Further, it would be appreciated by one skilled in the art that an incomplete calibration may be resumed at the start of the last completed step in the calibration sequence to avoid starting over completely.

At step 304, a DC reference signal is determined that is used as a reference to compare the other signal values during calibration. Given that the determined DC reference value is stored in memory, step 304 need not be repeated every time the calibration sequence is done, as indicated by dashed line 320. As shown in greater detail in FIG. 4a, the DC reference signal magnitude is determined by generating a square-wave calibration signal of a sufficiently low frequency to approximate a DC signal and applying the calibration signal to the input of CTF 108 at step 304b. In an exemplary embodiment of the present invention, the frequency of the square-wave calibration signal is approximately equal to fs/96, where fs is the sampling frequency of quantizer 110. Thus, when fs is equal to 3.6 GHz, the "DC" reference signal frequency is approximately 37.5 MHz, which is sufficiently close to a DC signal when compared to fs.

At step 304c, the squared signal magnitude of the filtered DC reference signal is determined. As described above in relation to FIG. 1, the filtered DC reference signal is sampled by quantizer 110. The outputs of quantizer 110 are provided to sample selection block 116 and a 4-point discrete Fourier transform ("DFT") 118 and a 3-point DFT 120. The output of the selected DFT is squared and summed to approximate the magnitude of the filtered reference signal. Because 96 is a multiple of both 3 and 4, either the 3-point 120 or the 4-point DFT 118 may be used. At step 304d, the calculated DC reference magnitude is stored to DC reference register 126. As would be apparent to one of skill in the art, other multiples of 3 or 4 may be used (e.g. 24).

Now referring back to FIG. 3, at step 306, the unboosted cutoff frequency, fc, of the filter is tuned. In this step, the initial Q value of the filter is not known, and is assumed to be equal to 0.707. As described above with regard to FIG. 2, in step 306, the gain of biquad 200A and the values of capacitance arrays 232 and 234 will be adjusted to affect the cutoff frequency of the filter. Further, the gain, Gm, of biquad 200A, and the gain, Gmq, of biquad 200B will be held in a fixed ratio during frequency tuning of CTF 108.

As shown in greater detail in FIG. 4b, the unboosted cutoff frequency is tuned by generating a cutoff frequency calibration signal at step 306b and applying the signal to CTF 108. In an exemplary embodiment, the cutoff frequency calibration signal has a frequency approximately equal to fs/3. Thus, when fs is equal to 3.6 GHz, fs/3 is equal to 1.2 GHz. The frequency fs/3 was chosen because it provides a reasonable amount of signal attenuation while still providing a sample with adequate significant bits, but other frequencies may be used.

At step 306c, the squared signal magnitude of the filtered fs/3 reference signal is determined. As described above in relation to FIG. 1, the filtered fs/3 reference signal is sampled by quantizer 110. The outputs of quantizer 110 are provided to sample selection block 116 and tuning controller 122 activates multiplexer 124 to select the output of 3-point DFT 120. The output of DFT 120 is squared and summed to approximate the magnitude of the filtered reference signal. The calculated fs/3 reference magnitude is stored to squared magnitude register 128.

At step 306d, the stored fs/3 reference magnitude is compared to the stored DC reference magnitude, multiplied by a calibration frequency factor, shown as 154, 156 and 158 in FIG. 1. The calibration frequency factor for the fs/3 calibration frequency is selected by multiplexer 134. The difference between the fs/3 reference magnitude and the scaled DC reference value is compared to a calibration frequency threshold value, shown as 160, 162 and 164 in FIG. 1. The calibration frequency threshold value for the fs/3 calibration frequency is selected by multiplexer 136. The calibration frequency factors threshold values are based upon the expected values for each calibration frequency, shown as 144, 146 and 148 in FIG. 1.

If the fs/3 reference magnitude is approximately equal to the scaled DC reference magnitude, the filter cutoff frequency is tuned, and processing moves to step 306g, where there is a delay to allow transients to settle before ending the cutoff frequency tuning subprocess at step 306h. If the fs/3 reference magnitude is less than the scaled DC reference magnitude, the filter cutoff frequency is too low and must be increased at step

306e. If the fs/3 reference magnitude is greater than the scaled DC reference magnitude, the filter cutoff frequency is too high and must be reduced at step 306f. As described above, the cutoff frequency of CTF 108 may be adjusted by changing the values stored in fc adjust register 140 (FIG. 2). Once fc is increased or reduced at step 306e or 306f, respectively, the tuning process returns to step 306b. The process will continue as described above until the fs/3 reference magnitude is approximately equal to the scaled DC reference magnitude, and the filter cutoff frequency is tuned.

Returning to FIG. 3, since the actual value of Q is not known at step 306, the value of Q is determined at step 308. If the Q value of the filter is actually 0.707 as assumed during step 306, the filter should have a flat frequency response. As shown in greater detail in FIG. 4c, the flatness of the frequency response is calibrated by generating a Q calibration signal at step 308b and applying the signal to CTF 108. In an exemplary embodiment, the Q calibration signal has a frequency approximately equal to fs/6. Thus, when fs is equal to 3.6 GHz, fs/6 is equal to 600 MHz. If the filter response is approximately the same at fs/3 and fs/6, then the filter frequency response may be presumed to be sufficiently flat.

Referring back to FIG. 3, adjusting Q in step 308 can affect the cutoff frequency that was tuned in step 306 since it is the ratio of the different Gm values that define the filter response. If Q is adjusted at step 308, it is necessary to go back to step 306 to re-adjust the cutoff frequency, as shown by dashed line 322 in FIG. 3. After step 306 is performed, step 308 is always performed to insure the Gm ratio is correct. Thus, steps 306 and 308 are an iterative process until the desired flat frequency response with the proper cutoff frequency. Without performing tuning steps 306 and 308, the cutoff frequency of the filter may be correct, but the peak boost frequency could be at the wrong point in the frequency response curve.

At step 310, the overall gain of the filter is adjusted to provide peak gain at the operating frequency of the filter. The boost peak for this filter type is at approximately fs/3, which is another reason why that frequency was chosen. The adjusting in step 310 is substantially the same as in step 308, but with a different target magnitude value. In step 310, the goal is to provide the maximum gain at the operating frequency of the filter. Since the overall frequency response shape was tuned in steps 306 and 308, step 310 need be performed only once. In step 310, the gain, Gmq, of biquad 200B is controlled by Gmq control register 244 and the gain, Gin, of biquad 200A, and the gain, Gmq, of biquad 200B are no longer held in a fixed ratio.

Figure 5:
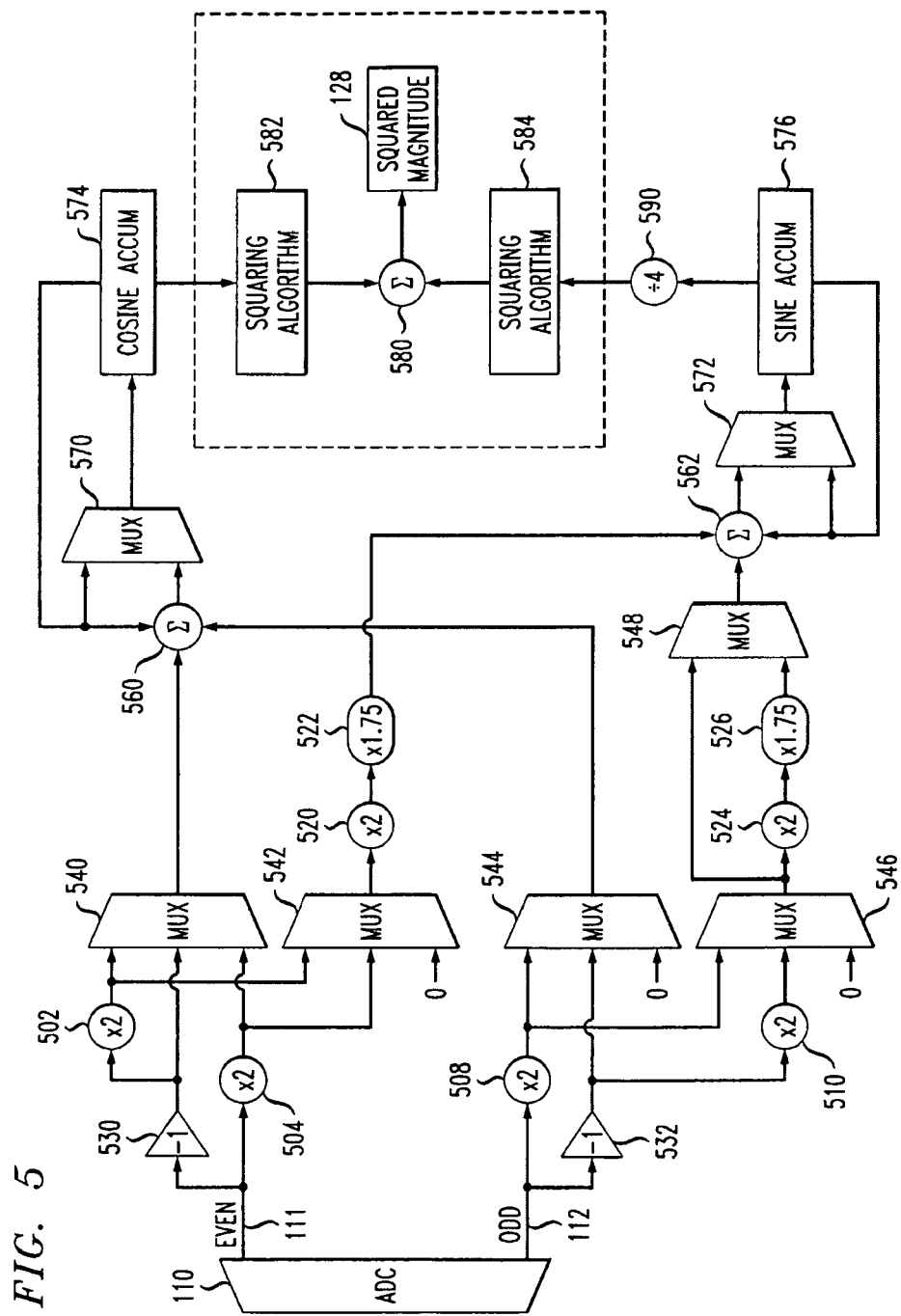
FIG. 5 shows a block diagram of a Discrete Fourier Transform circuit, in accordance with an exemplary embodiment of the present invention.

FIG. 5 shows an exemplary block diagram of the Discrete Fourier Transform ("DFT") circuit 114 (FIG. 1) in accordance with another exemplary embodiment of the present invention. The exemplary embodiment shown in FIG. 5 implements both a 3-point DFT and a 4-point DFT. Because the 3-point DFT and the 4-point DFT share the same hardware, as shown in FIG. 5, minimal physical space is used, and either the 3-point DFT or the 4-point DFT may be selected to be active, for example by controller 122. The DFT is characterized by the equation:

$$H(j\omega) = \sum_{k=0}^{YP} r[k]\left(\cos\left(\frac{k2\pi}{P}\right) - j\sin\left(\frac{k2\pi}{P}\right)\right).$$

where P is the number of points in the DFT and Y is the number of periods to accumulate.

In an exemplary embodiment, the 3-point DFT 120 can be implemented by taking six samples from quantizer 110. Quantizer 110 takes two samples every sample clock cycle, Xeven (output 111) and Xodd (output 112), so three clock cycles are necessary to take six samples. The sine and cosine terms of the DFT equation are then calculated for each sample. The unscaled sine and cosine terms are shown in table 1 below:

TABLE 1

| Period | sample(k) | $\cos(2\pi * k/3)$ | $\sin(2\pi * k/3)$ |
|---|---|---|---|
| 1 | Xeven(0) | 1 | 0 |
| 1 | Xodd(1) | −0.5 | 0.866 |
| 2 | Xeven(2) | −0.5 | −0.866 |
| 2 | Xodd(3) | 1 | 0 |
| 3 | Xeven(4) | −0.5 | 0.866 |
| 3 | Xodd(5) | −0.5 | −0.866 |

However, in order to maintain sample accuracy, the sine and cosine terms shown in Table 1 are scaled by one or more scaling factors. In an exemplary embodiment, the cosine terms are scaled up by a factor of two and the sine terms are scaled up by a factor of eight. For the cosine terms, for example, scaling up by a factor of 2 (left shift one bit) prevents losing the least significant bit (LSB) when multiplying by 0.5 (right shift one bit). For the sine terms, for example, instead of the 0.866 term as shown in table 1, a multiplier of 0.875 was chosen for easier implementation. Further, because the scaling of the sine terms should match the scaling of the cosine terms, the multiplier should be scaled up by a factor of 2 (0.875*2=1.75), shown as multipliers 522 and 526. In order to prevent the least significant bits being lost during DFT calculations, the sine terms are scaled up by an additional factor of 4 (left shift 2 bits). Then, once DFT calculations are complete, the accumulated sine terms could be divided by 4 (right shift 2 bits) and, thus, match the 2 times scaling factor of the cosine terms. Thus, in an exemplary embodiment, the terms in Table 1 are scaled as shown in Table 1A below:

TABLE 1A

| Period | sample(k) | $\cos(2\pi * k/3)$ | $\sin(2\pi * k/3)$ |
|---|---|---|---|
| 1 | Xeven(0) | 2 | 0 |
| 1 | Xodd(1) | −1 | 7 |
| 2 | Xeven(2) | −1 | −7 |
| 2 | Xodd(3) | 2 | 0 |
| 3 | Xeven(4) | −1 | 7 |
| 3 | Xodd(5) | −1 | −7 |

To calculate the cosine terms, in the first period of the sample clock cycle, Xeven(0) is multiplied by 2. The multiply by 2 (left shift one bit) is represented by multiplier 504 in FIG. 5. The shifted value is then added to the two's complement of the Xodd(1) sample. The two's complement is represented by inverter 532. In the second period of the clock cycle, multiplexers 540 and 544 change so that the Xeven(2) sample is negated by inverter 530 and the Xodd(3) sample is multiplied by 2 by multiplier 508. In the third period, multiplexers 540 and 544 change again so that the Xeven(4) and the Xodd(5) samples are negated by inverter 530 and 532, respectively. On each cycle, the selected output terms are summed by adder 560 and accumulated in the cosine accum register 574. This three period cycle may be repeated some number of times to get an average. The multiplexers 540, 542, 544 and 546 of the 3-point DFT are controlled by a counter (not shown) that counts 0, 1, 2. As would be apparent to one skilled in the art, in exemplary embodiments, the counter may be implemented as software on a microprocessor, which may be the same microprocessor used to implement tuning controller 122 (FIG. 1).

Similarly as discussed above for the cosine terms, multiplexers 542 and 546 change on each clock cycle to determine which sample is selected. In period 1, multiplexer 542 selects the 0 input to be multiplied with Xeven(0). Multiplexer 546 selects the non-inverted Xodd(1) sample from multiplier 508, which is then multiplied at blocks 524 and 526 and selected by multiplexer 548 to achieve a total multiplier of 7. In period 2, multiplexer 542 selects the Xeven(2) sample that is inverted by 530 and multiplied by 502, which is then multiplied at 520 and 522 to achieve a total multiplier of −7. Multiplexer 546 selects the 0 input to be multiplied with Xodd(3). In period 3, multiplexer 542 selects the Xeven(4) sample that is non-inverted from multiplier 504, which is then multiplied at 520 and 522 to achieve a total multiplier of 7. Multiplexer 546 selects the inverted Xodd(5) sample from multiplier 510, which is then multiplied at blocks 524 and 526 and selected by multiplexer 548 to achieve a total multiplier of −7. On each cycle, the selected output terms are summed by adder 562 and accumulated in the sine accum register 576. The resulting accumulated sine terms are then rescaled at divider 590 to match the scaling of the accumulated cosine terms.

The resulting accumulated cosine terms and the resealed accumulated sine terms are then squared by squaring algorithms 582 and 584, respectively. The squared terms are summed by adder 580 to provide the final squared magnitude value, which is stored in the squared magnitude register 128. The DFT terms may be accumulated over numerous sample periods to generate an average value.

In an exemplary embodiment, the 4-point DFT 118 can be implemented by taking four samples from quantifier 110. As shown in FIG. 5, in an exemplary embodiment both the 3-point and the 4-point DFT are implemented by one circuit, therefore, the sine and cosine terms of the 4-point DFT shown in Table 2 may also be scaled up by one or more scaling factors to correspond to the scaling of the sine and cosine terms of the 3-point DFT described above. In an exemplary embodiment, the samples are multiplied by 2 to match the 3-point DFT for absolute magnitude. Quantizer 110 takes two samples every sample clock cycle, Xeven and Xodd, so two sample clock periods are necessary to take four samples. The sine and cosine terms are then calculated for each sample. The scaled sine and cosine terms are shown in Table 2 below:

TABLE 2

| Period | sample(k) | $\cos(2\pi * k/4)$ | $\sin(2\pi * k/4)$ |
|---|---|---|---|
| 1 | Xeven(0) | 2 | 0 |
| 1 | Xodd(1) | 0 | 2 |
| 2 | Xeven(2) | −2 | 0 |
| 2 | Xodd(3) | 0 | −2 |

This pattern repeats every two sample clock periods and does not require the additional multiplication of the 3-point DFT since the only terms are 2 and −2. Multiplexer 548 is thus configured to bypass multipliers 524 and 526 for the 4-point DFT. The sine and cosine terms are calculated in the same way as described above with regard to the 3-point DFT, with multiplexers selecting the proper terms, but the 4-point DFT only needs a counter (not shown) controlling multiplexers 540, 542, 544, and 546 that counts 0, 1.

For calculations with the lower frequencies such as fs/6 and fs/96, Xeven and Xodd are downsampled by skipping the appropriate number of samples and performing the same DFT algorithms described above. As would be apparent to one of skill in the art, any frequency that is generally evenly divisible by 3 or 4 may be used with the 3-point and 4-point DFT algorithms, respectively. This downsampling is shown in FIG. 1 as sample select 116, and as multiplexers 570 and 572 in FIG. 5. Multiplexers 570 and 572 are controlled by a third counter that controls when to accumulate the samples. The downsampling rate is approximately equal to the ratio of the calibration frequencies. For example, using fs/3 and fs/6 as the frequencies for calibration signals 144 and 146 (FIG. 1), allows the downsampling rate to be equal to 2.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

While the exemplary embodiments of the present invention have been described with respect to processes of circuits, including possible implementation as a single integrated circuit, a multi-chip module, a single card, or a multi-card circuit pack, the present invention is not so limited. As would be apparent to one skilled in the art, various functions of circuit elements may also be implemented as processing blocks in a software program. Such software may be employed in, for example, a digital signal processor, micro-controller, or general-purpose computer.

The present invention can be embodied in the form of methods and apparatuses for practicing those methods. The present invention can also be embodied in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits. The present invention can also be embodied in the form of a bitstream or other sequence of signal values electrically or optically transmitted through a medium, stored magnetic-field variations in a magnetic recording medium, etc., generated using a method and/or an apparatus of the present invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

I claim:

1. A tuning circuit for a continuous-time filter, the tuning circuit coupled to a discrete Fourier transform calculation circuit that calculates an N-point Fourier transform, the discrete Fourier transform calculation circuit having a first input configured to receive an even quadrature sample value and an even phase sample value in a sample period, and a second input configured to receive an odd quadrature sample value and an odd phase sample value in said sample period, the discrete Fourier transform calculation circuit comprising:
   a counter configured to count the sample periods;
   an even sample value scaling circuit having a selectable even scaling factor;
   an odd sample value scaling circuit having a selectable odd scaling factor;
   a first adder configured to sum the scaled even and odd quadrature sample values;
   a second adder configured to sum the scaled even and odd phase sample values;
   a first accumulator configured to accumulate the summed even and odd quadrature sample values; and
   a second accumulator configured to accumulate the summed even and odd phase sample values;
   wherein N is selectable and is either 3 or 4, the even and odd scaling factors are selectable based upon the value of N and the value of the sample period count, and wherein when N is set to 3, the counter counts 3 sample periods, and wherein when N is set to 4, the counter counts 2 sample periods,
   wherein the tuning circuit is configured to employ the summed even and odd quadrature sample values accumulated in the first accumulator and the summed even and odd phase sample values accumulated in the second accumulator to adjust one or more performance characteristics of the continuous-time filter.

2. The continuous-time filter of claim 1, wherein the even sample value scaling circuit further comprises:
   a first parallel multiplier having a multiplication factor equal to $-1$;
   a second parallel multiplier having a multiplication factor equal to 2;
   a parallel path including a multiplier having a multiplication factor equal to 2 in series with the first parallel multiplier to provide a third parallel multiplier having a multiplication factor equal to $-2$;
   a zero input to provide a fourth parallel multiplier having a multiplication factor equal to 0;
   at least one multiplexer to select one of the parallel multipliers; and
   at least one series multiplier having a multiplication factor equal to 3.75,
   wherein the setting of the at least one multiplexer determines the even scaling factor for the sample value.

3. The continuous-time filter of claim 2, wherein, when N is set to 3, in a first sample period the at least one multiplexer is configured to select a the even scaling factor of 2 for the quadrature sample and of 0 for the phase sample; in a second sample period, the at least one multiplexer is configured to select a the even scaling factor of $-1$ for the quadrature sample and of $-7$ for the phase sample; in a the third sample period, the at least one multiplexer is configured to select a the even scaling factor of $-1$ for the quadrature sample and of 7 for the phase sample.

4. The continuous-time filter of claim 2, wherein, when N is set to 4, for the even quadrature and phase samples, in a first sample period the at least one multiplexer is configured to select a the even scaling factor of 2 for the quadrature sample and of 0 for the phase sample; in a second sample period, the at least one multiplexer is configured to select a the even scaling factor of $-2$ for the quadrature sample and of 0 for the phase sample.

5. The continuous-time filter of claim 1, wherein the odd sample value scaling circuit further comprises:
   a first parallel multiplier having a multiplication factor equal to $-1$;
   a second parallel multiplier having a multiplication factor equal to 2;
   a parallel path including a multiplier having a multiplication factor equal to 2 in series with the first parallel multiplier to provide a third parallel multiplier having a multiplication factor equal to $-2$;
   a zero input to provide a fourth parallel multiplier having a multiplication factor equal to 0;
   at least one multiplexer to select one of the parallel multipliers; and
   at least one multiplexer to select a series multiplier having a multiplication factor equal to 3.75,
   wherein the setting of the multiplexers determines the odd scaling factor for the sample value.

6. The continuous-time filter of claim 5, wherein, when N is set to 3, for the odd quadrature and phase samples, in a first sample period the at least one multiplexer is configured to select a the odd scaling factor of $-1$ for the quadrature sample and of 7 for the phase sample; in a second sample period, the at least one multiplexer is configured to select a the odd scaling factor of 2 for the quadrature sample and of 0 for the phase sample; in a third sample period, the at least one multiplexer is configured to select a the odd scaling factor of $-1$ for the quadrature sample and of $-7$ for the phase sample.

7. The continuous-time filter of claim 5, wherein, when N is set to 4, for the odd quadrature and phase samples, in a first sample period the at least one multiplexer is configured to select a the odd scaling factor of 0 for the quadrature sample and of 2 for the phase sample; in a second sample period, the at least one multiplexer is configured to select a the odd scaling factor of 0 for the quadrature sample and of $-2$ for the phase sample.

8. The continuous-time filter of claim 1, further comprising a quantizer to sample the input signal at a rate fs.

9. The continuous-time filter of claim 2, wherein the multipliers are shift registers.

10. A method of calculating an N-point discrete Fourier transform using a discrete Fourier transform calculation circuit of coupled to a tuning circuit of a continuous-time filter, the method comprising:
    generating by a quantizer, from a sample period of the quantizer for a received signal; an even quadrature sample value, an even phase sample value of the received signal, an odd quadrature sample value, and an odd phase sample value of the received signal;
    counting, by a counter, a number of sample periods of the quantizer;
    scaling, by at least one scaling circuit, the even quadrature sample value, the even phase sample value, the odd quadrature sample value, and the odd phase sample value by at least one scaling factor;
    adding, by a first adding circuit, the scaled even quadrature sample value and the scaled odd quadrature sample value;

adding, by a second adding circuit, the scaled even phase sample value and the scaled odd phase sample value;

accumulating, by a first accumulator, the added scaled even and odd quadrature sample values;

accumulating, by a second accumulator, the added scaled even and odd phase sample values; and adjusting, based on the accumulated added scaled even and odd quadrature sample values and the accumulated added scaled even and odd phase sample values, one or more performance characteristics of the continuous-time filter, wherein N is selectable and is either 3 or 4, the at least one scaling factor is selectable based upon the value of N and the number of sample periods, and wherein when N is set to 3, the counter counts 3 sample periods, and wherein when N is set to 4, the counter counts 2 sample periods.

11. The method of claim 10, wherein an even scaling circuit of the at least one scaling circuit comprises:
   a first parallel multiplier having a multiplication factor equal to −1;
   a second parallel multiplier having a multiplication factor equal to 2;
   a parallel path including a multiplier having a multiplication factor equal to 2 in series with the first parallel multiplier to provide a third parallel multiplier having a multiplication factor equal to −2;
   a zero input to provide a fourth parallel multiplier having a multiplication factor equal to 0;
   at least one multiplexer to select one of the parallel multipliers; and
   at least one series multiplier having a multiplication factor equal to 3.75,
   wherein the setting of the at least one multiplexer determines an even scaling factor for the sample value.

12. The method of claim 11, wherein, when N is set to 3, the method further comprises:
   selecting, by the at least one multiplexer in a first sample period, an even scaling factor of 2 for the quadrature sample and of 0 for the phase sample;
   selecting, by the at least one multiplexer in a second sample period, an even scaling factor of −1 for the quadrature sample and of −7 for the phase sample; and
   selecting, by the at least one multiplexer in a third sample period, an even scaling factor of −1 for the quadrature sample and of 7 for the phase sample.

13. The method of claim 11, wherein, when N is set to 4, the method further comprises:
   selecting, by the at least one multiplexer in a first sample period, an even scaling factor of 2 for the quadrature sample and of 0 for the phase sample; and
   selecting, by the at least one multiplexer in a second sample period, an even scaling factor of −2 for the quadrature sample and of 0 for the phase sample.

14. The method of claim 10, wherein, for the method, an odd scaling circuit of the at least one scaling circuit comprises:
   a first parallel multiplier having a multiplication factor equal to −1;
   a second parallel multiplier having a multiplication factor equal to 2;
   a parallel path including a multiplier having a multiplication factor equal to 2 in series with the first parallel multiplier to provide a third parallel multiplier having a multiplication factor equal to −2;
   a zero input to provide a fourth parallel multiplier having a multiplication factor equal to 0;
   at least one multiplexer to select one of the parallel multipliers; and
   at least one multiplexer to select a series multiplier having a multiplication factor equal to 3.75,
   wherein the setting of the multiplexers determines an odd scaling factor for the sample value.

15. The method of claim 14, wherein, when N is set to 3, the method further comprises:
   selecting, by the at least one multiplexer in a first sample period, an odd scaling factor of −1 for the quadrature sample and of 7 for the phase sample;
   selecting, by the at least one multiplexer in a second sample period, an odd scaling factor of 2 for the quadrature sample and of 0 for the phase sample; and
   selecting, by the at least one multiplexer in a third sample period, an odd scaling factor of −1 for the quadrature sample and of −7 for the phase sample.

16. The method of claim 14, wherein, when N is set to 4, the method further comprises:
   selecting, by the at least one multiplexer in a first sample period, an odd scaling factor of 0 for the quadrature sample and of 2 for the phase sample; and
   selecting, by the at least one multiplexer in a second sample period, an odd scaling factor of 0 for the quadrature sample and of −2 for the phase sample.

17. The method of claim 11, wherein, for the method, the multipliers are shift registers.

18. The method of claim 14, wherein, for the method, the multipliers are shift registers.

* * * * *